(12) United States Patent
Morin et al.

(10) Patent No.: US 7,328,649 B2
(45) Date of Patent: Feb. 12, 2008

(54) AUTOMATIC DISTRIBUTOR FOR INFUSED OR BREWED BEVERAGES

(75) Inventors: Gilles Morin, Saint Honorinc du Fay (FR); Didier Brodin, Verson (FR); Luc Morcel, Cacn (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 11/268,656

(22) Filed: Nov. 8, 2005

(65) Prior Publication Data

US 2006/0096469 A1    May 11, 2006

(30) Foreign Application Priority Data

Nov. 9, 2004    (FR) .................................. 04 11894

(51) Int. Cl.
*A47J 31/00*    (2006.01)
(52) U.S. Cl. ...................... 99/286; 99/289 R; 99/302 P
(58) Field of Classification Search .................. 99/275, 99/279, 286–307, 323, 495, 485
See application file for complete search history.

(56) References Cited

U.S. PATENT DOCUMENTS

| | | | | |
|---|---|---|---|---|
| 4,852,472 A | * | 8/1989 | In-Albon et al. .......... | 99/289 R |
| 4,885,986 A | * | 12/1989 | Grossi ...................... | 99/289 R |
| 5,255,594 A | * | 10/1993 | Grossi ......................... | 99/287 |
| 5,349,897 A | * | 9/1994 | King et al. ............... | 99/289 R |
| 5,479,849 A | * | 1/1996 | King et al. ................... | 99/287 |
| 5,490,447 A | * | 2/1996 | Giuliano ..................... | 99/286 |
| 5,823,096 A | | 10/1998 | Shih | |
| 6,253,664 B1 | * | 7/2001 | Giannelli ................. | 99/302 P |
| 2006/0117960 A1 | * | 6/2006 | Fischer ....................... | 99/279 |

FOREIGN PATENT DOCUMENTS

| | | |
|---|---|---|
| DE | 299 15 025 U1 | 1/2000 |
| WO | WO 9912457 A1 * | 3/1999 |

\* cited by examiner

*Primary Examiner*—Timothy F. Simone
(74) *Attorney, Agent, or Firm*—Browdy and Neimark P.L.L.C.

(57) ABSTRACT

An automatic unit for preparing infused or brewed beverages from a powdered or ground product, including: an infusion group that includes an infusion chamber, a pressing piston and an actuating mechanism that produce a relative sliding movement between the pressing piston and the infusion chamber along a travel path, from a rest position in which the pressing piston is located outside the chamber to a work position in which the pressing piston is within the chamber; a product distributor having an opening and a chute defining a flow path disposed to channel the product from the distributor toward the infusion chamber; and a cleaning device arranged to contact the chute and to be driven by the pressing piston or by the infusion chamber over at least a part of the travel path in order to remove residual product from the chute.

13 Claims, 4 Drawing Sheets

DETAIL A

AUTOMATIC DISTRIBUTOR FOR INFUSED OR BREWED BEVERAGES

BACKGROUND OF THE INVENTION

The present invention relates to an automatic distributor in an appliance for brewing or infusing beverages, for distributing powdered product that will be infused, percolated, or brewed, the powdered product being, for example, ground coffee, tea, cocoa, etc.

An appliance for the preparation and distribution of hot beverages generally includes a cold water reservoir, an electric pump, a boiler, and an infusion, or brewing, head arranged to receive the ground product in order to inject therein hot water coming from the boiler, the resulting beverage then being directed toward a collecting vessel. At the end of the infusion cycle, the infusion head must be opened in order to be able to introduce therein a new quantity of powdered product after having removed the product remaining after a previous infusion.

Such an appliance is described in the patent document WO 99/12457, the disclosure of which is incorporated herein by reference, which relates to an appliance arranged to automatically distribute espresso coffee made from coffee grounds. The appliance has an infusion group composed of an infusion chamber having a vertical axis arranged to receive a pressing piston that slides along the vertical axis and is actuated by the piston of a hydraulic piston-cylinder unit. The latter piston is connected to the pressing piston and can pass from a rest position to a work position in which the pressing piston is driven into the infusion chamber under the influence of the hydraulic fluid in the cylinder. Return to the rest position is effected by a return spring.

This appliance also includes an automatic distributor of grounds having a reservoir containing the grounds and provided with a distribution opening, a chute conducting the grounds toward the infusion chamber, and a hub connected to a shaft that rotates paddles carried by the hub in order to push a certain quantity of grounds into the chute via the distribution opening when the hub is being rotated. Such an automatic distributor of grounds is described in the French patent document FR 2713906, the disclosure of which is incorporated herein by reference.

Although this appliance functions satisfactorily, it has nevertheless been observed that clumps of coffee appear in the channel that conducts the grounds from the distributor toward the infusion chamber. In effect, after producing several successive batches of coffee, the infusion chamber releases moisture in the form of steam. The chute along which the coffee grounds descend being situated in proximity to the infusion chamber, the steam released in the chamber condenses on the walls of the chute, thus promoting adherence of the coffee grounds or powder. These grounds or powder then accumulate on the walls of the chute, with the result that, after several coffee brewing cycles, coffee can collect on the chute and between the chute and the infusion chamber, the accumulations being larger in the case of finer coffee grounds.

Moreover, the patent document WO 03/013324, the disclosure of which is incorporated herein by reference, describes another ground coffee dosing device arranged in the housing of a coffee machine having an infusion chamber supplied from the chute of the device, whose inlet opening opens to the outside of the housing. The ground coffee dosing device has a trap door movably mounted in the upper part of the chute and arranged to determine a dosing volume corresponding to the volume of the infusion chamber. The trap door is pivotally mounted in the chute and is actuated by the movement of a control rod connected to the pivot structure of the lid. The rod in particular has an end stub mounted in an articulating manner on the lid having the form of a domed pin in which, besides its function of driving the trap door, performs the supplementary function of scraping the upper surface of the latter. However, such a device actuated by the manual opening of the lid is not adapted to the function of an automatic distributor of beverages where most of the functions are automated.

BRIEF SUMMARY OF THE INVENTION

The present invention serves to overcome the above-cited drawbacks and provides an automatic unit for infused or brewed beverages having a distributor of powdered or ground product able to avoid accumulation of the product in the chute leading to the infusion or brewing chamber.

The invention further provides an automatic unit for infused beverages able to prepare a beverage of good quality and fresh taste.

The present invention also provides in a simple and inexpensive manner an automatic unit for infused beverages that operates reliably.

More specifically, the present invention provides an automatic unit for preparing infused beverages from a powdered or ground product, the unit comprising:

an infusion group that includes an infusion chamber able to receive a pressing piston and actuating means that produce a relative sliding movement of the pressing piston and/or of the infusion chamber with respect to the other along a travel path, starting from a rest position in which the pressing piston is located outside of the chamber to a work position in which the piston is within the chamber, and a product distributor having a distribution opening communicating with a chute disposed to channel the product toward the infusion chamber, wherein the chute is brought in contact with a cleaning device driven by the pressing piston or by the infusion chamber over at least a part of the travel path in order to remove residual product from the chute.

The powdered product distributor can be of a type having a reservoir containing the product to be infused and at the interior of which there is provided a hub having paddles, or blades, capable of passing a certain quantity of the product through the distribution opening and onto the chute that conveys the product in proximity to the infusion chamber. Such a distributor can also be a coffee grinder that directly sends a certain quantity of coffee, through the distribution opening, or by the intermediary of a buffer chamber, onto the chute that transfers it into the infusion chamber. Such a chute is a conduit that is oriented generally vertically or at an angle to the vertical with respect to the infusion chamber, so that the powdered product falls by gravity into the infusion chamber.

More particularly according to the invention, the chute of the distributor is cleaned automatically by the cleaning device. A cleaning device is thus understood to be a device having means that perform a scraping, wiping or fluid jet cleaning action. The cleaning device can thus act by direct contact with the chute of the distributor, even when using a fluid, such as air, blown or aspirated in the direction of the chute.

Such a direct contact of the cleaning device with the chute can be effected at a single point, notably by a striking movement, by touching the chute in a sharp manner, the chute being mounted for example, through the intermediary of elastic attachment means. The chute is thus shaken to cause any powder or grounds that have adhered to the walls to be loosened and to then fall through the distribution opening. Alternatively, this contact by the cleaning device can occur at several points along the path followed by a cleaning device element that is displaced along, and against the walls of, the chute. Cleaning of the chute is thus performed automatically since the cleaning device is driven by a movable element of the appliance, for example the pressing piston and/or the infusion chamber. The pressing piston and the chamber are arranged in a manner that one slides relative to the other along an axis that can be vertical, horizontal, or inclined, while being driven by a mechanism that is placed in movement by an electric motor, a hydraulic piston-cylinder unit, or jack, etc.

The solution described above has been found to be simple and economical, since it does not require an additional mechanism or drive for such mechanism. Moreover, this cleaning is performed automatically during each cycle, without requiring intervention by the user, such as a control operation, etc., which guarantees that a beverage having a fresh taste will always be obtained.

Advantageously, the cleaning device is directly driven by the pressing piston during its sliding movement.

One can, of course, consider a solution in which the cleaning device is driven by an intermediate mechanism that transforms, for example, a linear vertical movement of the pressing piston into a specific movement of the cleaning device relative to the chute of the distributor. It is presently preferred, to achieve greater simplicity and reliability, that the cleaning device be driven directly during movement of the pressing piston.

Preferably, the cleaning device is a scraper fixed to the pressing piston in a manner to enable the scraping device to be displaced along the length of the chute.

The scraper can be a rigid part having a form complementary to that of the channel provided by the chute, possibly mounted in a flexible, or elastic, manner in order to be able yield slightly while moving along the chute. Alternatively, the scraper can be a wiper that is a slightly larger part made of a flexible or pliable material, such as, for example, foam rubber or sponge, that is pressed against the walls of the chute. According to a further alternative, the scraper can be in the form of a brush having tufts of bristles provided to sweep the walls of the chute. The scraper can also be provided in the form of an air jet from a nozzle connected to a pump or a blower, the nozzle being displaced along the chute and acting to blow away the coffee powder, or grounds. In a variant, the air nozzle could be preceded by a component for spraying water along the walls of the chute.

Thus, according to a preferred embodiment of the invention, the cleaning device is acted on by the movement of the pressing piston, which, itself, effectuates a vertical downward sliding movement permitting a scraper that protrudes from the piston to descend along the walls of the transfer chute of the powdered product distributor. This assures a good cleaning of the chute along its entire length, permitting detachment of even very fine particles attached to the chute walls, with a compact construction that does not increase the size of the appliance.

Usefully, the chute has a transverse cross-section in the form of a U, being opened toward the scraper, the chute possibly having an inclination relative to the vertical and extending toward the infusion chamber. Such a chute, having an inclined orientation with respect to the vertical axis of the infusion chamber, assures a good transfer of the powdered product toward the infusion chamber while permitting the scraper to have free access to the internal walls of the chute.

According to another embodiment of the invention, the scraper is in contact with the internal wall of the chute and the chute is pivotally mounted, against the action of a biasing spring, with respect to the frame of the distributor.

This permits a rigid mounting of the scraper, the chute then having a certain mobility in order to compensate for play due to the positioning, the assembly or the fabrication of the components, while being in permanent contact, under the action of the biasing spring, with the active surface of the scraper.

Advantageously, the chute can be mounted to pivot, during contact with the scraper, from a first position where it is oriented toward the infusion chamber to a second position where it is oriented in the direction of a recovery tank.

Thus, this pivoting can occur around a horizontal or vertical axis in a manner to orient the chute either toward the infusion chamber for the transfer of powdered product to be infused, or toward an adjacent tank for recovery of the residues of any product accumulating on the walls of the chute and removed by rubbing of the scraper against the internal walls of the chute.

According to another embodiment of the invention, the scraper is a flexible sweeper that comes in contact with the internal wall of the chute.

Thus, such a flexible sweeper can traverse the length of the chute, which it cleans at the same time and assures a good rubbing contact with its internal wall, or walls. In this case, the chute can be mounted in a fixed position, for example with a rigid attachment with respect to its support, or, as stated previously, it can be mounted to pivot against the return action of a biasing spring.

Preferably, the scraper has a front part with an external contour that conforms to the internal contour of the chute.

Thus, there is obtained a good cleaning of the entirety of the internal walls of the chute by a rubbing contact with a part having a complementary form. The transfer chute of the distributor is thus freed of all residue of the powdered product, which guarantees a fresh taste to the beverage obtained.

Advantageously, the pressing piston is connected to the piston of a hydraulic piston-cylinder unit, or jack, actuated by a hydraulic fluid under pressure supplied from a hydraulic circuit contained in the housing of the automatic distributor.

Such an actuation by a hydraulic piston-cylinder unit assures the descent and thus compression of the pressing piston in the infusion chamber under the effect of the fluid supplied under pressure in the hydraulic circuit of the appliance, this occurring in a simple and reliable manner relative to motorized movement mechanisms that are often complex. Usefully, the return, or lifting, path of the pressing piston out of the infusion chamber is carried out under the effect of a return spring in order to obtain a supple and practical operation. Moreover, such a hydraulic piston-cylinder unit has been found to be very useful in the case of an automatic coffee maker since the piston adjusts automatically to the quantity of grounds present in the infusion chamber during compression, without taking into account the fineness of the coffee grounds, its moisture content, etc., in order to obtain an optimum compaction of the latter and a good quality of the resulting coffee beverage.

Preferably, the powdered product distributor comprises a coffee bean grinder.

Thus, according to a first embodiment of the invention, the automatic distributor has a coffee bean grinder, offering the advantage of producing a coffee beverage having a very fresh taste.

According to another embodiment of the invention, the distributor of powdered product has a reservoir for coffee grounds mounted to be removable from the automatic distributor housing.

Thus, such a distributor of ground coffee is advantageously removably mounted with respect to the appliance housing to allow a more thorough cleaning, or even to allow replacement by another distributor containing different coffee grounds or another type of powdered or ground product.

BRIEF DESCRIPTION OF THE DRAWINGS

The invention will be better understood from a study of the embodiments presented by way of non-limiting example and illustrated in the following attached figures.

DETAILED DESCRIPTION OF THE INVENTION

Figure 1B:
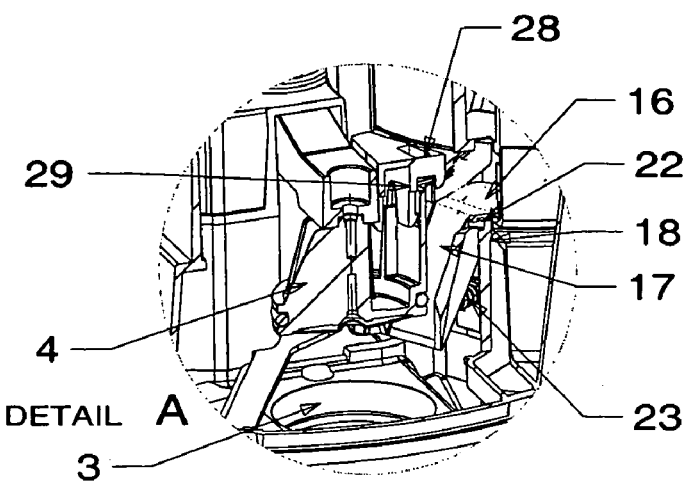
FIG. 1b is a detailed view to an enlarged scale of the portion of the distributor of FIG. 1a shown in the circle A.
Figure 1A:
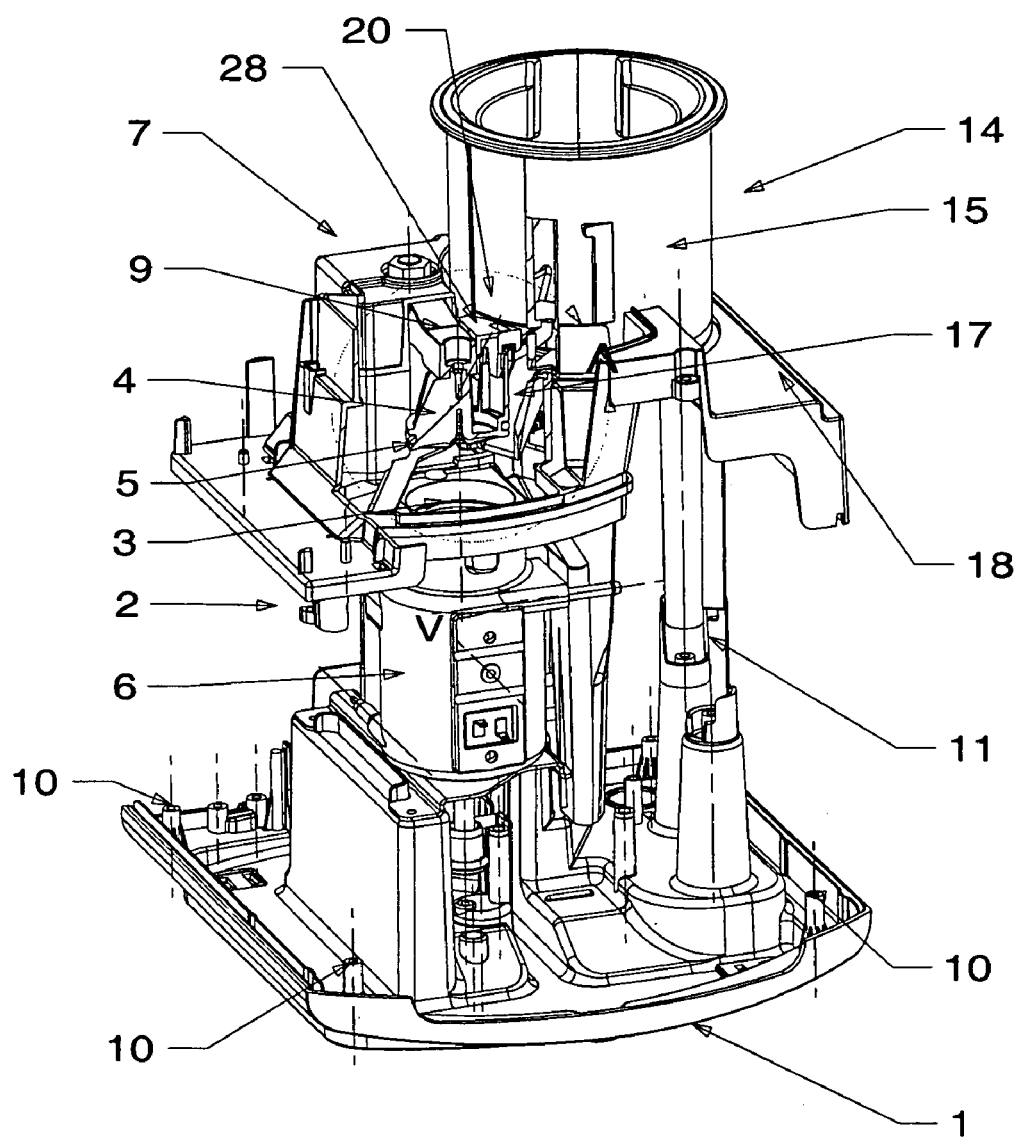
FIG. 1a is a perspective view of an automatic distributor according to a first embodiment of the invention, with the external housing being omitted and where an upper portion is shown in partial cross-section in a plane passing through the axis of a pressing piston of the appliance.

The automatic distributor shown in FIGS. 1a and 1b is an automatic espresso making machine that includes a housing that is shown only partially in the figure. The housing has a base 1 that is shown in the form of a support for the components of the appliance, which will be described below. The upper part of the housing is secured to base 1 by screws installed in opening 10 provided around the periphery of base 1. FIG. 1a further shows an infusion group 2 composed of an infusion chamber 3 in the form of a receptacle, or tank, constructed to receive a certain quantity of ground coffee in a region above a lower wall forming a filter for the coffee grounds. In this example, infusion chamber 3 is mounted in a fixed manner above a heating block 6 that extends along a vertical axis, V, as a prolongation of chamber 3. Heating block 6 encloses a water circuit and an electric heating element (not shown) but it can be constructed in accordance with the description presented in the patent document WO 99/12456, the disclosure of which is incorporated herein by reference. Heating block 3 assures a supply of hot water for infusion chamber 3. In this case, the heating block could be separate from the infusion chamber so that it can take other forms, such as in the form of an elongated cylinder, or a flat form, with a liquid delivery tube then connecting the two organs.

Infusion chamber 3 also receives a pressing piston 4 that slides along the same vertical axis, V, in order to compact the grounds. Pressing piston 4 includes an O-ring seal 5 that provides a liquid-tight seal with infusion chamber 3, while the coffee beverage is being made. The appliance also includes actuating means 7 for pressing piston 4. Actuating means 7 are constituted, in the example shown, by a hydraulic piston-cylinder unit, or jack, 8, shown in FIG. 3. Unit 8 has an internal piston which is connected to pressing piston 4 by the intermediary of a rigid bar 9. Hydraulic unit 8 receives a liquid under pressure from a hydraulic circuit of the appliance, pressure on the liquid causing downward displacement of the piston of the piston-cylinder unit at the same time that pressing piston 4 moves from a rest position (in the upper part of the appliance) to a work position, by descending vertically in the direction of infusion chamber 3 in order to compress the grounds. Details of a suitable form of construction for the piston-cylinder unit and the actuation of the pressing piston are disclosed in the patent document WO 99/12457, cited earlier herein. Hot water is then sent through the grounds and the infused beverage is then evacuated through a canal provided in pressing piston 4, the canal being prolonged by a conduit that directs the beverage toward the outside of the latter, where it is collected in a cup. The hydraulic jack described here is a single acting device, return of the jack piston to the rest position being effected by a spring located within the cylinder.

The appliance also includes a distributor 14 of ground product which includes, in the example shown in FIG. 1a, a reservoir 15 for ground coffee, the reservoir being removably mounted on a seat 18 located within the casing of the appliance, for example with the aid of a bayonet connection. The transfer of ground coffee toward an outlet opening 16 (FIG. 3) in the direction of a chute 17 is assured by an internal part equipped with blades that will be driven in rotation by a motor-reducer in order to push the grounds toward opening 16. The quantity of coffee delivered is controlled by a cam provided with bosses and turning at the same speed as the motor-reducer. The number of bosses is detected by a microswitch. Thus, the number of passages of bosses determines the quantity of ground coffee transferred toward chute 17. Distributor 14 may be constructed as disclosed in French patent document FR 2713906, cited earlier herein.

Chute 17 has the general form of a ski-jump inclined relative to the vertical and widening at its lower part situated above infusion chamber 3. The upper part of chute 17 is arranged at the outlet of reservoir 15, just below opening 16 of the latter. Chute 17 is pivotally supported by seat 18, which is itself fixed to frame 11 of the appliance. FIG. 1b shows two cylindrical tenons 22, arranged at the upper sides of chute 17 and mounted in rotation in corresponding openings in seat 18, seat 18 having been omitted from FIG. 1b in order to more clearly show the chute and the cleaning device. The two tenons 22 of chute 17 together form a horizontal pivot axis of chute 17. Chute 17 is connected, at its lower part, through the intermediary of a compression spring 23, to a support that is fixed relative to seat 18. Spring 23 maintains chute 17 in an initial position where it is oriented toward infusion chamber 3 to introduce coffee grounds therein. Chute 17 can pivot away from that position, toward a vertical orientation, against the return force of spring 23, as will be further explained below, in order to orient it toward an inlet 25 of a conduit for excess grounds that communicates with a recovery vessel situated therebelow.

More particularly, according to the invention, the appliance includes a device 20 for cleaning chute 17, device 20 being fixed to pressing piston 4. Cleaning device 20 includes a scraper 28, shown most clearly in FIG. 2, whose base 29 is provided with two attachment clips at the interior of pressing piston 4, as shown in FIG. 1*b*. The front part 30 of scraper 28 (shown in FIG. 2) is positioned to move in contact with the walls of chute 17. Front part 30 of scraper 28 has the form of a rake, or comb, having a width corresponding to that of chute 17. Scraper 28 extends perpendicular to the longitudinal axis of pressing piston 4, and thus to the vertical axis V, while being inclined, relative to the horizontal plane, in the direction toward chute 17. By its attachment to pressing piston 4, scraper 28 effectuates the same vertical sliding movement as piston 4.

Figure 2:
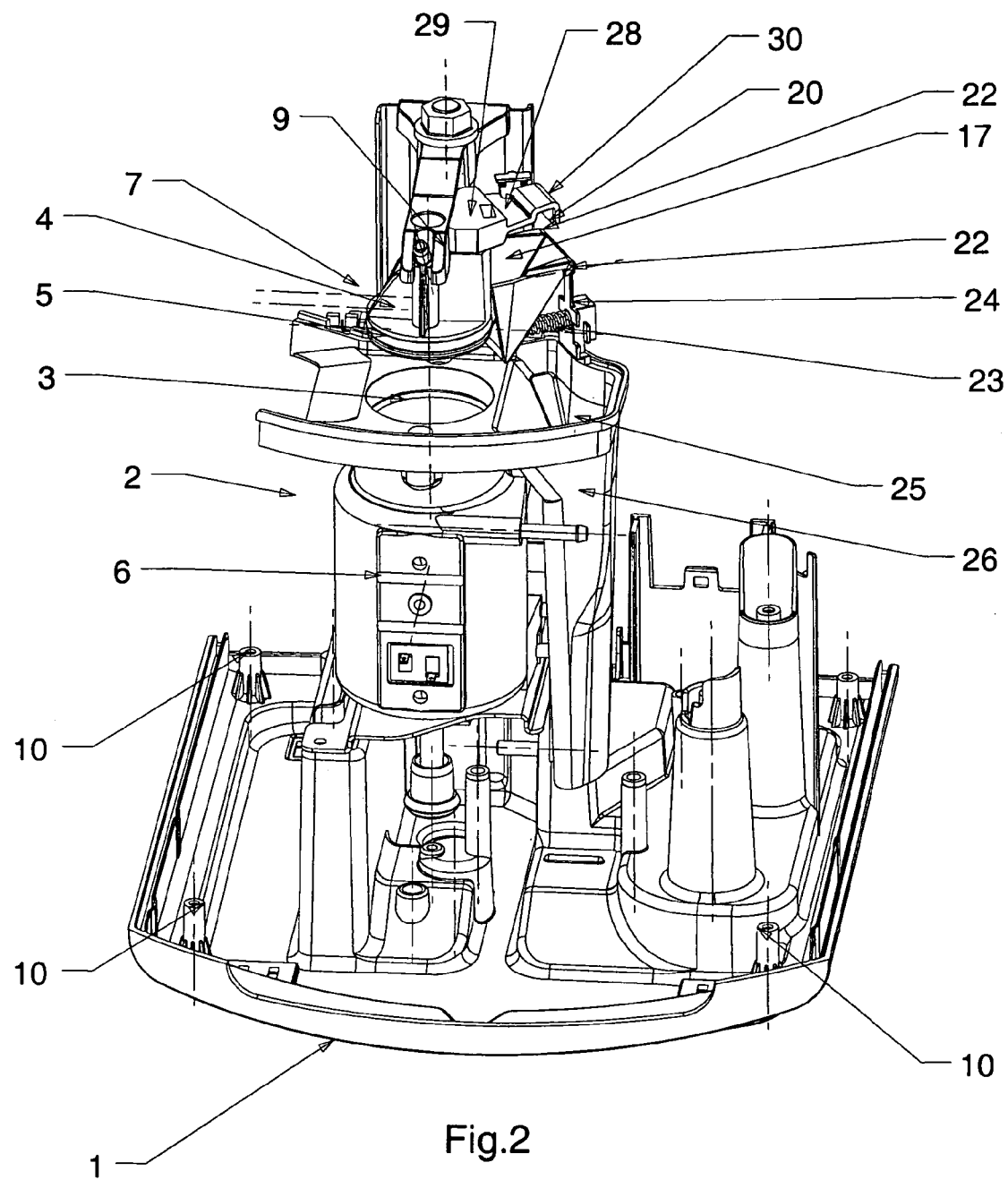
FIG. 2 is a perspective view of an automatic distributor according to the first embodiment of the invention, with certain components having been omitted to facilitate understanding.

In operation, after having verified the presence of coffee grounds in reservoir 15, the user initiates a cycle for preparation of the coffee beverage. In the initial state, pressing piston 4 is in the raised, or rest, position, as shown in FIGS. 1*a*, 1*b* and 2. The preparation cycle begins with the introduction of a dose of ground coffee into infusion chamber 3. The coffee is transferred from reservoir 15, via opening 16 and chute 17, into infusion chamber 3 above heating block 6. Hydraulic unit 8 then drives pressing piston 4 downwardly toward and into infusion chamber 3, in which pressing piston 4 descends to its position for compressing the grounds.

During this phase of downward movement of pressing piston 4, scraper 28 also moves downwardly in order to scrape and clean the walls of chute 17. Compression spring 23 urges chute 17 toward scraper 28 and maintains scraper 28 in contact therewith during its descent. During its downward movement, scraper 28 pushes against chute 17 to cause the chute to pivot around its pivot axis in the direction of the inlet 25 of conduit, or channel, 26. The ground coffee that became attached to the wall of chute 17 during delivery into chamber 3 is thus detached and directed toward conduit 26, and from there into the recovery vessel.

Pressing piston 4 remains in its lowered position during the phase of infusion of the coffee, during which hot water is injected from heating block 6 into infusion chamber 3, from which the brewed coffee then passes, through a channel formed in pressing piston 4, to a location outside of the appliance toward a cup provided to receive the brewed coffee. The structure providing the passages for injection of hot water and for conducting brewed beverage to a cup can have the form disclosed in the patent document WO 99/12456, cited earlier herein. After completion of the infusion phase, pressing piston 4 and scraper 28 rise, under the influence of the return spring of the piston-cylinder unit, toward the raised position and chute 17 returns to its initial position in response to the return force of spring 23. The distributor is then ready to undergo a new coffee preparation cycle.

Figure 3:
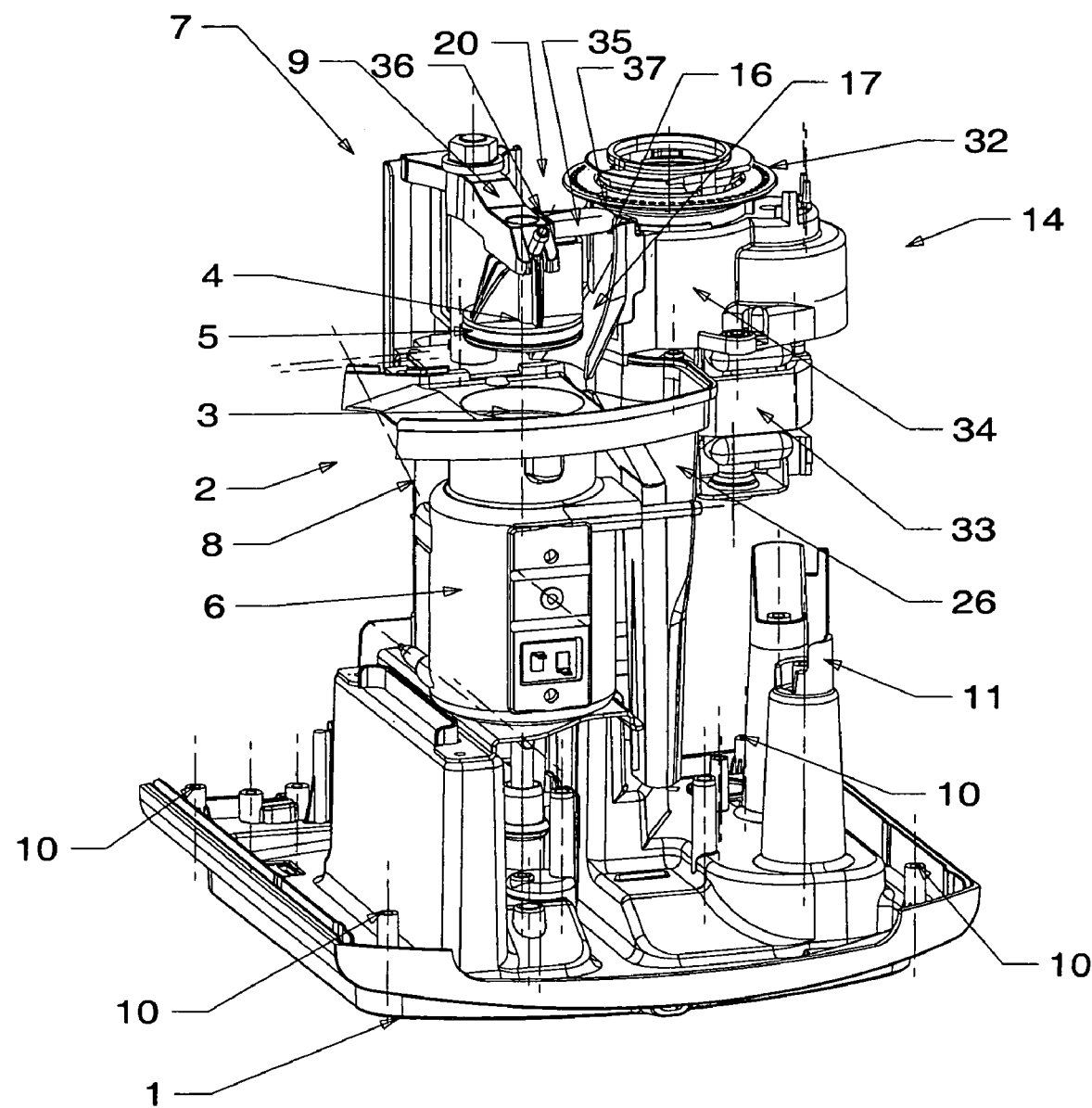
FIG. 3 is a perspective view of an automatic distributor according to a second embodiment of the invention, with certain components having been omitted to facilitate understanding.
Figure 3A:
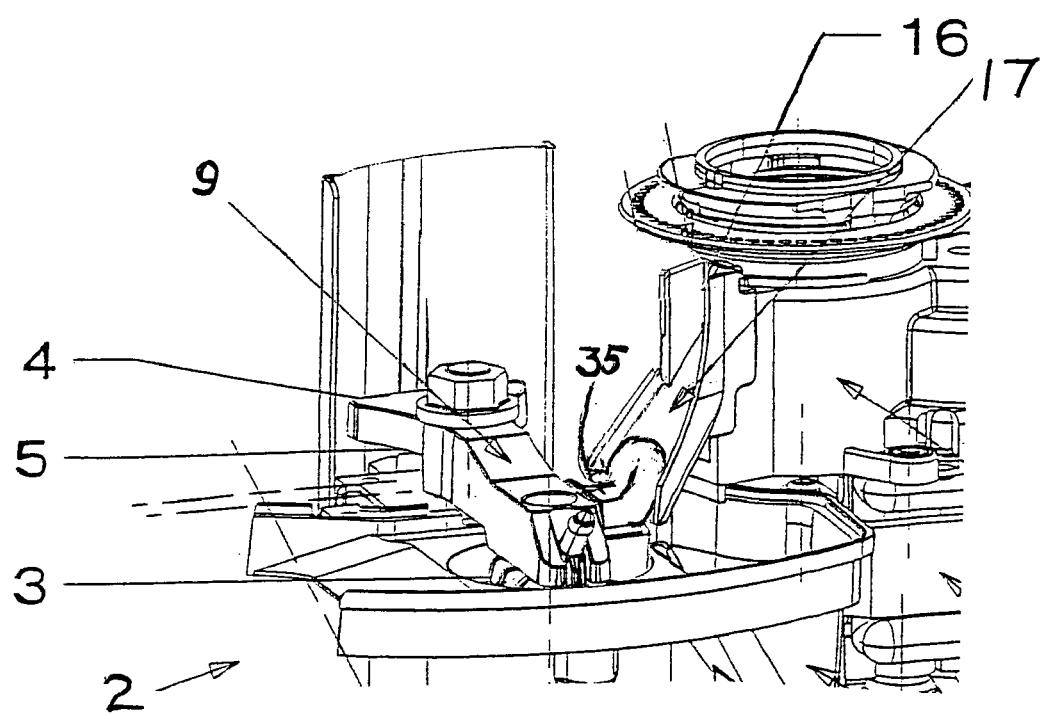
FIG. 3A is a detail perspective view of a portion of the distributor of FIG. 3, showing the pressing piston in a work position.

FIG. 3 shows another embodiment of the invention in which those elements that are the same as the elements of FIGS. 1 and 2 have the same reference numerals. The appliance is composed of an infusion group 2 including an infusion chamber in the form of a receptacle arranged to receive a certain quantity of ground coffee above a lower wall forming a filter for the coffee grounds. In this example, infusion chamber 3 is also mounted in a fixed manner above heating block 6, which has a vertical axis V, and receives pressing piston 4 that compresses the coffee grounds in response to the action of hydraulic piston-cylinder unit 8, as described above.

The appliance also includes a distributor 14 for ground product that is, in the example shown in FIG. 3, a coffee bean grinder 32. The coffee grinder, or mill, is of conventional structure, and generally has a reservoir for coffee beans in an upper part and, in a lower part, a shaft driven in rotation by an electric motor 33 in order to rotate grinding elements, such as blades, against fixed grinding elements, the coffee beans being introduced between these elements in order to be ground and to exit in the ground state through distribution opening 16 and into chute 17.

Chute 17 here again has the general form of a ski-jump inclined with respect to the vertical and widened in its lower part that is located above infusion chamber 3, the upper part of chute 17 being arranged at the outlet of grinder 32, against the walls of opening 16. Chute 17 is mounted in a fixed manner against body 34 of grinder 32.

The appliance also includes a device 20 for cleaning chute 17, device 20 being fixed relative pressing piston 4. This cleaning device 20 according to this second embodiment includes a flexible sweeper 35 having a rigid base 36 that is fixed, for example by attachment clips, to bar 9 of pressing piston 4. Alternatively, base 36 can be connected directly to piston 4. Sweeper 35 can be made of any flexible material, for example rubber, and it has the form of a loop whose ends are fixed to base 36 and whose frontal part 37 is disposed to move in contact with chute 17.

When the appliance is operated to prepare coffee, the ground coffee distributor dispenses toward chute 17 a predetermined quantity of ground coffee, corresponding to a predetermined operating time of grinder 32, to obtain the desired quantity of coffee in infusion chamber 3. During downward movement of pressing piston 4, to the work position shown in FIG. A, sweeper 35 comes in contact with the wall of chute 17, a contact that is maintained by the inherent elasticity of sweeper 35. Any ground coffee that remains adhered to the walls of chute 17 is removed by the action of sweeper 35, and falls initially into infusion chamber 3 when the latter is open, i.e., before chamber 3 is closed by pressing piston 4, then when piston 4 closes the chamber, coffee grounds being scraped from chute 17 strike the cylindrical outer surface of piston 4, then fall in the direction of conduit 26 for receiving excess coffee grounds, and then flow into a recovery tank. At the end of the infusion cycle, pressing piston 4 returns to its raised position along with sweeper 35 and the distributor is ready to begin a new operating cycle.

Other embodiments of the invention can be conceived without departing from the framework of the accompanying claims.

It is equally possible to provide an infusion chamber that is displaced along a helical path with respect to the piston. A cleaning device could then be fixed to this movable chamber in order to clean a chute, particularly one providing a helical flow path.

This application relates to subject matter disclosed in French Application number FR 04 11894, filed on Nov. 9, 2004, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic unit for preparing infused or brewed beverages from a powdered or ground product, said unit comprising:
   an infusion group that includes an infusion chamber, a pressing piston and actuating means that produce a relative sliding movement between said pressing piston and said infusion chamber along a travel path, from a rest position in which said pressing piston is located outside of said chamber to a work position in which said pressing piston is within said chamber;
   a product distributor having an opening and a chute defining a product flow path disposed to channel the product from said distributor and along said chute toward said infusion chamber;
   a cleaning device arranged to contact said chute and to be driven along at least a portion of said chute in order to remove residual product from said chute; and
   means coupled to said cleaning device for driving said cleaning device.

2. The automatic unit according to claim 1, wherein said actuating means produce sliding movement of said pressing piston and said cleaning device is directly driven by said pressing piston during the sliding movement.

3. The automatic unit according to claim 2, wherein said cleaning device comprises a scraper fixed to said pressing piston in a manner to enable said scraper to be displaced along said chute during sliding movement of said pressing piston.

4. The automatic unit according to claim 3, wherein said chute: has a transverse cross-section in the form of a U; opens toward said scraper; and is inclined relative to the vertical and extends toward said infusion chamber.

5. The automatic unit according to claim 4, wherein said chute has an internal wall along which the product descends, said scraper is in contact with said internal wall, and said chute is pivotally mounted, against the action of a biasing spring, with respect to said product distributor.

6. The automatic unit according to claim 5, wherein said chute is mounted to pivot, during displacement of said scraper, from a first position where said chute is oriented toward said infusion chamber to a second position where said chute is oriented toward a recovery tank for product scraped off of said chute.

7. The automatic unit according to claim 3, wherein said scraper is a flexible sweeper mounted to be brought in contact with said chute.

8. The automatic unit according to claim 3, wherein said chute has an internal contour and said scraper has a front part with an external contour that conforms to said internal contour of said chute.

9. The automatic unit according to claim 1, wherein said pressing piston is connected to a piston of a hydraulic piston-cylinder unit actuated by a hydraulic fluid under pressure supplied from a hydraulic circuit contained in a housing of said automatic unit.

10. The automatic unit according to claim 1, wherein said product distributor comprises a coffee grinder.

11. The automatic unit according to claim 1, wherein said product distributor comprises a reservoir for coffee grounds mounted to be removable from said automatic unit.

12. An automatic unit for preparing infused or brewed beverages from a powdered or ground product, said unit comprising:
   an infusion group that includes an infusion chamber, a pressing piston and actuating means that produce a relative sliding movement between said pressing piston and said infusion chamber along a travel path, from a rest position in which said pressing piston is located outside of said chamber to a work position in which said pressing piston is within said chamber;
   a product distributor having an opening and a chute defining a product flow path disposed to channel the product from said distributor and along said chute toward said infusion chamber; and
   a cleaning device mounted to contact said chute and to be driven along at least a portion of said chute in order to remove residual product from said chute.

13. An automatic unit for preparing infused or brewed beverages from a powdered or ground product, said unit comprising:
   an infusion group that includes an infusion chamber, a pressing piston and actuating means that produce a relative sliding movement between said pressing piston and said infusion chamber along a travel path, from a rest position in which said pressing piston is located outside of said chamber to a work position in which said pressing piston is within said chamber, one of said infusion chamber and pressing piston being a movable element of said infusion group;
   a product distributor having an opening and a chute defining a product flow path disposed to channel the product from said distributor and along said chute toward said infusion chamber; and
   a cleaning device arranged to contact said chute and to be driven by said movable element along at least a portion of said chute in order to remove residual product from said chute.

* * * * *